(12) United States Patent
Fukano et al.

(10) Patent No.: US 9,245,212 B2
(45) Date of Patent: Jan. 26, 2016

(54) PRINTING SYSTEM AND PRINTING METHOD WHEREIN PRINT DATA FORMED BY PRINT DATA FORMING DEVICE ARE PRINTED BY PRINTER APPARATUS

(71) Applicant: DAI NIPPON PRINTING CO., LTD., Tokyo (JP)

(72) Inventors: Nobuya Fukano, Tokyo (JP); Yoshihiro Yano, Tokyo (JP); Takayuki Chikada, Tokyo (JP)

(73) Assignee: Dai Nippon Printing Co, Ltd., Tokyo (JP)

( * ) Notice: Subject to any disclaimer, the term of this patent is extended or adjusted under 35 U.S.C. 154(b) by 0 days.

(21) Appl. No.: 14/094,139

(22) Filed: Dec. 2, 2013

(65) Prior Publication Data

US 2014/0153032 A1   Jun. 5, 2014

Related U.S. Application Data

(63) Continuation of application No. 11/921,638, filed as application No. PCT/JP2006/311218 on Jun. 5, 2006, now Pat. No. 8,711,393.

(30) Foreign Application Priority Data

Jun. 7, 2005 (JP) .................. 2005-167328

(51) Int. Cl.
G06F 3/12 (2006.01)
G06K 15/02 (2006.01)
G06K 15/00 (2006.01)

(52) U.S. Cl.
CPC .......... *G06K 15/1806* (2013.01); *G06F 3/1204* (2013.01); *G06F 3/1222* (2013.01); *G06F 3/1238* (2013.01); *G06F 3/1286* (2013.01)

(58) Field of Classification Search
CPC ... G06F 3/1204; G06F 3/1222; G06F 3/1238; G06F 3/1286; G06K 15/1806
See application file for complete search history.

(56) References Cited

U.S. PATENT DOCUMENTS 5,986,568 A * 11/1999 Suzuki et al. .................. 340/9.1
6,859,832 B1    2/2005 Gecht et al.
7,443,527 B1   10/2008 Shigeeda
(Continued)

FOREIGN PATENT DOCUMENTS

CN    1479197 A    3/2004
EP    0777174      6/1997
(Continued)

*Primary Examiner* — Dov Popovici
(74) *Attorney, Agent, or Firm* — Dilworth & Barrese, LLP.

(57) ABSTRACT

A printing device, a printing system, a program, and a printing method for improving security and user-friendliness are disclosed. The printing system (1) includes PC (10-1) and printer devices (20-1 to 20-N) connected via LAN (50). The PC (10-1) has a printing data forming unit (111) for forming print data according to a user instruction, a print data transmission unit (113) for transmitting the formed print data to the printer devices (20-1 to 20-N), a communication unit (17). The printer devices (20-1 to 20-N) have an external storage device (23) for storing received print data, an input unit (26) for inputting a user print instruction and a user identifier, a card reader (24), a print data management unit (212) for reading out print data corresponding to the user identifier from the external storage device (23), a printer engine (28) for performing printing according to the print read out data.

8 Claims, 11 Drawing Sheets

(56) References Cited

U.S. PATENT DOCUMENTS

| | | |
|---|---|---|
| 2001/0053301 A1 | 12/2001 | Nishii |
| 2002/0027673 A1* | 3/2002 | Roosen et al. ............ 358/1.13 |
| 2003/0067621 A1 | 4/2003 | Tanaka |
| 2004/0010567 A1 | 1/2004 | Moyer et al. |

FOREIGN PATENT DOCUMENTS

| | | |
|---|---|---|
| EP | 1217509 | 6/2002 |
| JP | H10-011007 | 1/1998 |
| JP | 10-149061 | 6/1998 |
| JP | H10-149061 | 6/1998 |
| JP | 2000-010748 | 1/2000 |
| JP | 2000-177211 | 6/2000 |
| JP | 2001-071604 | 3/2001 |
| JP | 2001-186358 | 7/2001 |
| JP | 2002-032205 | 1/2002 |
| JP | 2002-149385 | 5/2002 |
| JP | 2003-182187 | 7/2003 |
| JP | 2003-330677 | 11/2003 |
| JP | 2003-330686 | 11/2003 |
| JP | 2004-72598 | 3/2004 |
| JP | 2004090235 | 3/2004 |
| JP | 2004-118232 | 4/2004 |
| JP | 2004-185566 | 7/2004 |
| JP | 2004280227 | 10/2004 |
| JP | 2004-330544 | 11/2004 |
| JP | 2005100111 | 4/2005 |
| JP | 2005107865 | 4/2005 |
| JP | 07-152520 | 12/2009 |

* cited by examiner

FIG. 2

| No. | PRINT DATA MANAGEMENT INFORMATION ||||||||
|---|---|---|---|---|---|---|---|---|
| | PRINT DATA IDENTIFICATION INFORMATION |||||| USER IDENTIFICATION INFORMATION || PRINT SETTING INFORMATION |
| | DATE AND TIME | PCID | FILE NAME | PAGE NUMBER | SIZE | STORAGE LOCATION | USER NAME | EMPLOYEE NUMBER | |
| 472 | 13:41:23 | 123 | ACCOUNTING.txt | 4~6 | 15KB | 01AA0123 | PARTY A | 123-45678 | ... |
| 473 | 13:43:31 | 111 | PROPOSAL.doc | 1~121 | 2638KB | 02BB1234 | PARTY B | 111-11111 | ... |
| 474 | 13:43:56 | 123 | ACCOUNTING.txt | 4~6 | 16KB | 06AB4321 | PARTY A | 123-45678 | ... |
| 475 | 13:43:07 | 123 | ACCOUNTING.txt | 8 | 7KB | 06CC3210 | PARTY A | 123-45678 | ... |
| | ... | ... | ... | ... | ... | ... | ... | ... | ... |

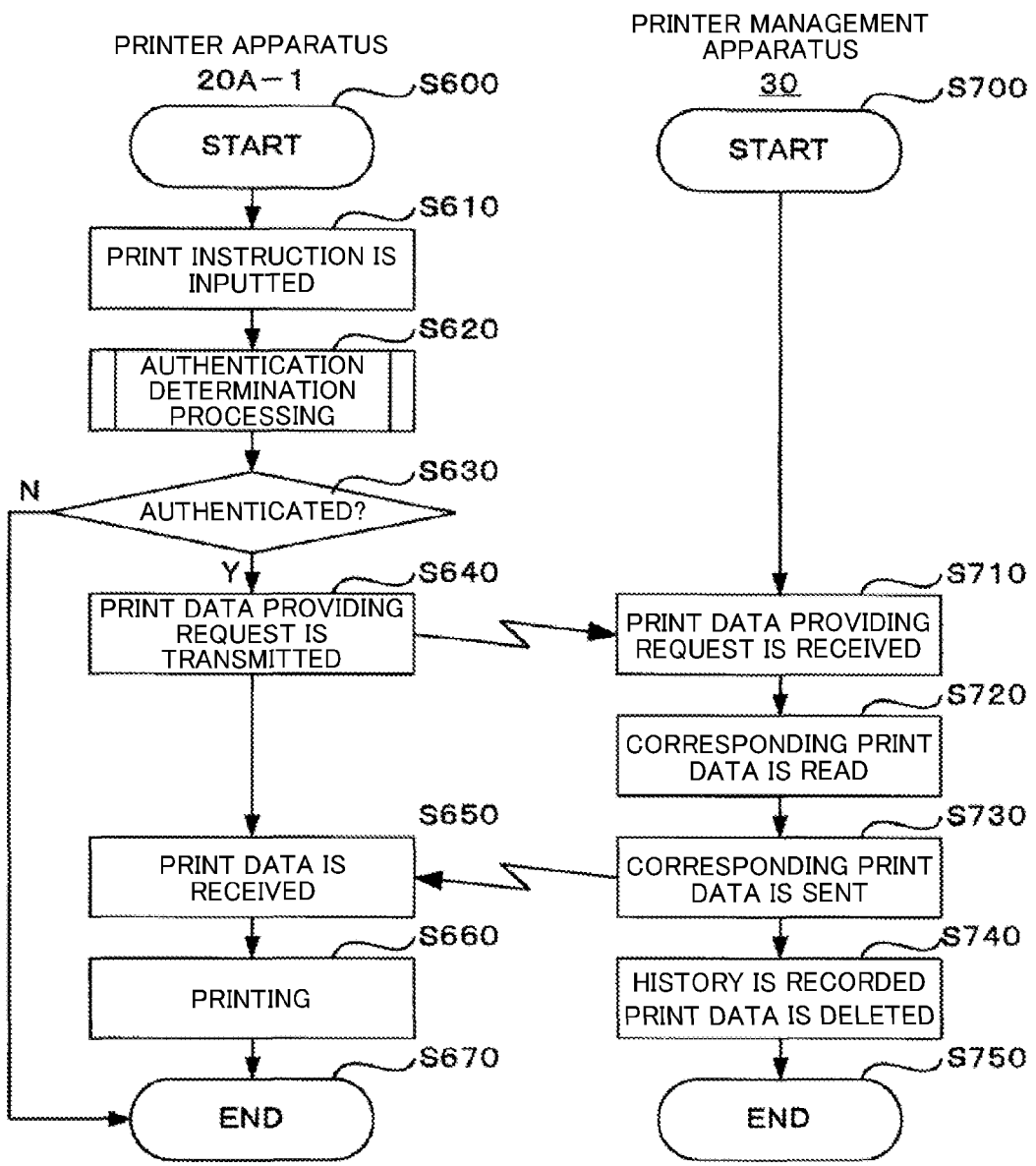

PRINTING SYSTEM AND PRINTING METHOD WHEREIN PRINT DATA FORMED BY PRINT DATA FORMING DEVICE ARE PRINTED BY PRINTER APPARATUS

TECHNICAL FIELD

The present invention relates to a printer apparatus for carrying out printing, a printing system including a plurality of printer apparatuses and a print data forming device that are connected through a network, a program run by a CPU of the printer apparatus, and a printing method carrying out by the printer apparatus on the basis of print data formed by the print data forming device.

BACKGROUND ART

In recent years, through the spread of networks such as LANs (Local Area Networks), printer apparatuses and personal computers (hereinafter referred to as "PCs") that are used by users are respectively connected through networks to share the printer apparatuses. Conventionally, the users operate PCs to form, for example, edit and create printer data (print data) to be later printed, transmit the formed print data to the printer apparatuses connected through the networks and have printing done by the printer apparatuses using printer drivers installed in the PCs. Furthermore, when a plurality of printer apparatuses are connected through the networks, the users operating the PCs designate the printer apparatuses serving as destinations of transmission of the printer data using identification information such as IP addresses. However, in environments where the distances between the users and the printer apparatuses are far, because the printer apparatuses output the print data transmitted thereto as soon as the print data is received, the printed contents may be seen by the other users before the users pick up the printed matters. Furthermore, the printed matters may be left in the printer apparatuses because the users may forget having issued print instructions. In order to solve such problems, there is provided a printer apparatus in which an instruction to start to output print information transferred from a host can be entrusted to only a normal user on the side of the printer apparatus by controlling a destination of output of image data generated in accordance with output limiting data among received print information (see, for example, Patent Document 1).

Patent Document 1: Japanese Unexamined Patent Application Publication No. Hei7-152520

DISCLOSURE OF THE INVENTION

Problems to be Solved by the Invention

However, a user is required to use a PC to designate a printer apparatus serving as a destination of output of print data, which imposes a burden on the user. Even if the user goes to the designated printer apparatus to issue an instruction to start to output print data, the user is required to wait or operate the PC to change the designated printer apparatus to another printer apparatus when the designated printer apparatus is carrying out printing for another print data, which lacks convenience. Furthermore, even when the user previously confirms how the printer apparatus is in use, a burden of confirmation is imposed on the user. Moreover, while the user is designating the printer apparatus after the confirmation, the printer apparatus may be used by other users. Therefore, the confirmation may be made in vain.

It is an objective of the present invention to provide a printer apparatus, a printing system, a program, and a printing method that improve security and user convenience.

Means for Solving the Problems

The present invention solves the problems described above using the resolving means described below. A description is provided while assigning corresponding numerals to embodiments of the present invention for ease of understanding, but this is by no means limiting. In accordance with a first aspect of the present invention, there is provided a printer apparatus (20A-1 to 20A-N) comprising: a print instruction inputting means (24, 26) for inputting a print instruction from a user; a print data acquiring means (213, 25) for acquiring, when the print instruction inputting means inputs the print instruction, print data from at least one information processing device (30) connected through a network (50) in response to the print instruction; and a printing means (28) for carrying out printing based on the print data acquired by the print data acquiring means.

In accordance with a second aspect of the present invention, in the printer apparatus (20A-1 to 20A-N) according to the first aspect of the present invention, the print instruction inputting means comprises an object print data identification information inputting means (24) for inputting object print data identification information for identifying the print data to be an object of the print instruction, and the print data acquiring means acquires at least one printing datum corresponding to the object print data identification information inputted by the object print data identification information inputting means from the at least one information processing device.

In accordance with a third aspect of the present invention, in the printer apparatus (20A-1 to 20A-N) according to the second aspect of the present invention, the print data acquiring means comprises an object print data identification information transmitting means (25, S640, #20, #320, #420, #510) for transmitting to the information processing device the object print data identification information inputted by the object print data identification information inputting means and an object print data receiving means (25, S650, #30, #430, #520) for receiving from the information processing device the print data corresponding to the object print data identification information transmitted by the object print data identification information transmitting means.

In accordance with a fourth aspect of the present invention, the printer apparatus (20A-1 to 20A-N) according to the third aspect of the present invention, comprises a print data storing means (23) for storing the print data, an object print data identification information receiving means (25, #420) for receiving the object print data identification information transmitted from at least one other printer apparatus according to claim 3 connected through the network (50), a determining means (21) for determining whether the print data corresponding to the object print data identification information received by the object print data identification information receiving means is stored in the print data storing means, and an object print data transmitting means (25, #430) for transmitting the print data corresponding to the object print data identification information to the at least one other printer apparatus according to claim 3 when the determining means determines that it is stored.

In accordance with a fifth aspect of the present invention, there is provided a printing system (1A), comprising a plurality of printer apparatuses (20A-1 to 20A-N) according to the first aspect of the present invention, and a print data forming device (10A-1) connected to the plurality of printer apparatuses through a network (50) in which the printer apparatuses carry out printing based on print data formed by the print data forming device, wherein the print data forming device comprises a print data forming means (111, S440) for forming the print data in accordance with a print instruction from a user, further comprises a print data providing means (11A, 17, 31, 34, S470, S510) for providing the print data formed by the print data forming device to an information processing device (30) connected to the network, wherein the information processing device comprises a print data storing means (33, S520) for storing the print data provided by the print data providing means, and a print data acquiring means, in the printer apparatus in which a print instruction inputting means inputs the print instruction, for acquiring the print data from the information processing device in response to the print instruction (S640, S650).

In accordance with a sixth aspect of the present invention, in the printing system (1A) according to the fifth aspect of the present invention, the information processing device comprises an object print data identification information receiving means (31, 34, S710) for receiving object print data identification information transmitted by an object print data identification information transmitting means in the printer apparatus, an object print data reading means (311, S720) for reading out the print data corresponding to the object print data identification information received by the object print data identification information receiving means from the print data storing means, and an object print data transmitting means (31, 34, S730) for transmitting the print data read out by the print data reading means to the printer apparatus serving as a source of transmission of the object print data identification information.

In accordance with a seventh aspect of the present invention, in the printing system (1A) according to the fifth aspect of the present invention, the print data forming device comprises a print instruction-capable user setting means (112A, S450) for setting a user who can issue a print instruction for the print data formed by the print data forming means, the print data providing means provides to the information processing device the print data formed by the print data forming means after associating instruction-capable user identification information for identifying the user set by the print instruction-capable user setting means with the print data (S470), and the print data storing means in the information processing device stores the print data provided by the print data providing means in association with the instruction-capable user identification information (S520), the print instruction inputting means in the printer apparatus comprises an instructed user identification information inputting means (24, S620) for inputting instructed user identification information for identifying a user who issues one of the print instruction and his or her attribute, the object print data identification information transmitting means in the printer apparatus transmits to the information processing device the instructed user identification information inputted by the instructed user identification information inputting means (S640), the object print data identification information receiving means in the information processing device receives the instructed user identification information transmitted from the printer apparatus, and the object print data reading means in the information processing device reads out at least one printing datum based on the instructed user identification information received by the object print data identification information receiving means and the instruction-capable user identification information stored in the print data storing means (S720).

In accordance with an eighth aspect of the present invention, in the printing system (1A) according to the fifth aspect of the present invention, the information processing device comprises a print history storing means (33, S740) for storing at least one of transmission-receiving history of the print data and a print history of the printer apparatus. In accordance with a ninth aspect of the present invention, in the printing system (1A) according to the fifth aspect of the present invention, the information processing device comprises a print data erasing means (311, S740) for erasing from the print data storing means print data that was the subject of printing by at least one of the printer apparatus and/or print data remaining for more than a predetermined time period.

In accordance with a tenth aspect of the present invention, there is provided a printing system (1) in which a print data forming device (10-1 to 10-N) and a plurality of printer apparatuses (20-1 to 20-N) are connected through a network, and the printer apparatuses carry out printing based on print data formed by the print data forming device, wherein the print data forming device comprises a print data forming means (111, S140) for forming the print data in accordance with a print instruction from a user, further comprising a print data providing means (11, 17, 21, 25, S160, S210) for providing the print data formed by the print data forming means to the plurality of printer apparatuses, and the printer apparatus comprises a print data storing means (23, S220) for storing the print data provided by the print data providing means, a print instruction inputting means (24, 26, S310, S320) for inputting the print instruction from the user, and a printing means (28, S350) for carrying out printing based on the print data stored in the print data storing means when the print instruction inputting means inputs the print instruction. In accordance with an eleventh aspect of the present invention, in the printing system (1) according to the tenth aspect of the present invention, the print instruction inputting means comprises an object print data identification information inputting means (24, S320) for inputting object print data identification information for identifying the print data to be an object of the print instruction, the printer apparatus comprises a print data reading means (212, S340) for reading out the print data corresponding to the object print data identification information inputted by the object print data identification information inputting means from the print data storing means, and the printing means carries out printing based on the print data read out by the print data reading means.

In accordance with a twelfth aspect of the present invention, in the printing system (1) according to the eleventh aspect of the present invention, the print data forming device comprises a print instruction-capable user setting means (11, S150) for setting a user who can issue a print instruction for the print data formed by the print data forming means, the print data providing means provides to the plurality of printer apparatuses the print data formed by the print data forming means after associating instruction-capable user identification information for identifying the user set by the print instruction-capable user setting means with the print data, the print data storing means in the printer apparatus stores the print data provided by the print data providing means in association with the instruction-capable user identification information with the print data (S220), the print instruction inputting means in the printer apparatus comprises an instructed user identification information inputting means (24) for inputting instructed user identification information for identifying a user who issues one of the print instruction and his or her attribute, and the print data reading means in the printer apparatus reads out at least one printing datum based on the instructed user identification information inputted by the instructed user identification information inputting means and the instruction-capable user identification information stored in the print data storing means (S340).

In accordance with a thirteenth aspect of the present invention, in the printing system according to the tenth aspect of the present invention, the printer apparatus comprises a print data erasing means (212, S380) for erasing from the print data storing means print data that was the subject of printing and/or print data remaining for at least a predetermined time period.

In accordance with a fourteenth aspect of the present invention, in the printing system (1, 1A) according to the fifth aspect of the present invention, the printer apparatus comprises an authentication information inputting means (24, S320, S620) for inputting authentication information for authenticating the user who issues the print instruction, and an authentication determining means (211, S330, S630) for determining whether the user who issues the print instruction is authenticated on the basis of the authentication information inputted by the authentication information inputting means, and the printing means in the printer apparatus carries out printing when the authentication determining means determines that the user is authenticated. In accordance with a fifteenth aspect of the present invention, the printing system (1, 1A) according to the fourteenth aspect of the present invention, further comprises a portable information storage medium (40) carried by the user, wherein the authentication information inputting means in the printer apparatus inputs from the portable information storage medium the authentication information for authenticating the user who issues the print instruction.

In accordance with a sixteenth aspect of the present invention, in the printing system (1, 1A) according to the fifteenth aspect of the present invention, the print data forming device comprises a formation-instructed user authentication information inputting means (14) for inputting from the portable information storage medium the authentication information for authenticating a user who issues an instruction to form the print data, and a formation-instructed user authenticating means (114) for authenticating the user who issues the instruction to form the print data based on the authentication information inputted by the formation-instructed user authentication information inputting means.

In accordance with a seventeenth aspect of the present invention, there is provided a program executable by a printer apparatus (20A-1 to 20A-N) in order to carry out printing based on print data, comprising: a print instruction inputting step (S610, S620) for inputting a print instruction from a user; a print data acquiring step (S640, S650) for acquiring, when the print instruction is inputted in the print instruction inputting step, print data from at least one information processing device connected to the printer apparatus through a network in response to the print instruction, and a printing step (S660) for carrying out printing based on the print data acquired in the print data acquiring step.

In accordance with an eighteenth aspect of the present invention, in the program according to the seventeenth aspect of the present invention, the print instruction inputting step includes an object print data identification information inputting step (S620) for inputting object print data identification information for identifying the print data to be an object of the print instruction, and in the print data acquiring step, at least one printing datum corresponding to the object print data identification information inputted in the object print data identification information inputting step is acquired from the at least one information processing device.

In accordance with a nineteenth aspect of the present invention, in the program according to the eighteenth aspect of the present invention, the print data acquiring step includes an object print data identification information transmitting step (S640) for transmitting to the information processing device the object print data identification information inputted in the object print data identification information inputting step, and an object print data receiving step (S650) for receiving from the information processing device the print data corresponding to the object print data identification information transmitted in the object print data identification information transmitting step.

In accordance with a twentieth aspect of the present invention, the program according to the nineteenth aspect of the present invention, further comprises an object print data identification information receiving step (#420) for receiving the object print data identification information transmitted from at least one other printer apparatus connected to the printer apparatus through the network, a determining step for determining whether the print data corresponding to the object print data identification information received in the object print data identification information receiving step is stored in the printer apparatus, and an object print data transmitting step (#430) for transmitting the print data corresponding to the object print data identification information to the at least one other printer apparatus when it is determined in the determining step that it is stored.

In accordance with a twenty-first aspect of the present invention, there is provided a printing method performed by a plurality of printer apparatuses (20A-1 to 20A-N) based on print data formed by a print data forming device (10A-1 to 10A-N) connected to the plurality of printer apparatuses through a network (50), comprising: a print data forming step (S440) of forming the print data in accordance with a print instruction from a user by the print data forming device; a print data providing step (S470, S510) of providing the print data formed in the print data forming step to an information processing device (30) connected to the network; a print data storing step (S520) of storing the print data provided in the print data providing step by the information processing device; a print instruction inputting step (S610, S620) of inputting the print instruction from the user by the printer apparatus; a print data acquiring step (S640, S650) of acquiring, when the printer apparatus inputs the print instruction in the print instruction inputting step, the print data from the information processing device in response to the print instruction; and a printing step (S660) of carrying out printing based on the print data acquired in the print data acquiring step by the printer apparatus.

In accordance with a twenty-second aspect of the present invention, there is provided a printing method performed by a plurality of printer apparatuses (10-1 to 10-N) based on print data formed by a print data forming device connected to the plurality of printer apparatuses through a network, comprising: a print data forming step (S140) of forming the print data in accordance with a print instruction from a user by the print data forming device; a print data providing step (S160, S210) of providing the print data formed in the print data forming step to the plurality of printer apparatuses; a print data storing step (S220) of storing the print data provided in the print data providing step by the printer apparatus; a print instruction inputting step (S310, S320) of inputting the print instruction from the user by the printer apparatus; and a printing step (S350) of carrying out printing, when the printer apparatus inputs the print instruction in the print instruction inputting step, based on the print data stored in the print data storing step.

Effects of the Invention

A printer apparatus, a printing system, a program, and a printing method according to the present invention allow the following effects to be obtained.

(1) When the printer apparatus inputs a print instruction from a user, the printer apparatus can carry out printing, even if it has not previously stored print data, by acquiring print data from an information processing device connected thereto through a network, which allows security to be improved. Since the printer apparatus acquires the print data, the need for the user to designate the printer apparatus in a print data forming device such as a PC is eliminated, which allows convenience to be improved. Furthermore, the user can have printing performed after going to any one of a plurality of printer apparatuses connected to the network to confirm whether or not the printer apparatus is available, which allows user convenience to be improved. Moreover, this can prevent the user from forgetting to retrieve printed matters and prevent the printed contents from being disclosed to at least one other user, which allows security to be improved. Additionally, when the one printer apparatus is unavailable, the user can have printing performed after going to the other printer apparatus without returning to the print data forming device such as the PC to similarly confirm the state thereof, which allows user convenience to be improved.

(2) A plurality of users and a plurality of print data forming devices can share the printer apparatus. For example, the printer apparatus acquires (or reads out) one or a plurality of print data corresponding to inputted object print data identification information, and carries out printing so that the user can designate print data to be the subject of printing, which allows efficiency and user convenience to be improved.

(3) The printer apparatus that has inputted the print instruction acquires print data to be an object of a print instruction from the other printer apparatus so that the print data can be transmitted and received among the plurality of printer apparatuses. Furthermore, the print data to be an object of a print instruction can be searched for among the printer apparatuses by determining whether or not the print data is stored. Therefore, the other printer apparatus can acquire print data only by storing the print data in any one of the printer apparatuses.

(4) The printer apparatus that has inputted the print instruction out of the plurality of printer apparatuses acquires the print data from the information processing device and carries out printing. Thus, the user can have printing done after going to any one of the plurality of printer apparatuses to confirm whether or not the printer apparatus is available, and the need to designate the printer apparatus to output print data in the print data forming device is eliminated, which allows user convenience to be improved. Furthermore, the information processing device stores print data until the printer apparatus inputs a print instruction, to centrally manage the print data, which enables security to be improved.

(5) The print data forming device that forms print data sets a user to be able to issue a print instruction, and reads out print data on the basis of the set contents (instruction-capable user identification information) and instructed user identification information, to carry out printing. Thus, the user able to issue the print instruction can be set by a user who has issued an instruction to form print data, which allows convenience and security to be improved. Furthermore, a plurality of print data associated with the instruction-capable user identification information representing the user who has issued the print instruction can be collectively printed, which allows user convenience to be improved.

(6) The information processing device stores a transmission-receiving history of print data and/or a print history, to manage the flow of the print data, which enables security to be improved. Particularly, by storing the instructed user identification information as a history, information indicating which user performed printing and which print data the user performed printing for can remain, which prevents the unfair use of the printer apparatus.

(7) The information processing device (or the printer apparatus) erases from the print data storing means print data to be the subject of printing and/or print data left for not less than a predetermined time period, to prevent the print data being disclosed, which causes security to be improved.

(8) The print data formed by the print data forming means is provided to the plurality of printer apparatuses, so that a user can have printing performed after going to any one of the plurality of printer apparatuses to confirm whether or not the printer apparatus is available, which allows user convenience to be improved.

(9) The printer apparatus carries out printing when it authenticates a user who issues a print instruction on the basis of inputted authentication information, which allows security to be improved.

(10) The printer apparatus inputs the authentication information from the portable information storage medium, so that a user can easily prove the validity of a print instruction, which causes convenience to be improved.

(11) The print data forming device authenticates a user on the basis of the authentication information inputted from the portable information storage medium, to limit users to the user who issues the instruction to form print data, which causes security to be improved. Furthermore, the print data forming device inputs the authentication information from the portable information storage medium, as in a case where the user who issues the print instruction is authenticated, so that the user can issue an instruction to form print data and issue a print instruction by using the one portable information storage medium, which allows convenience to be improved.

BRIEF DESCRIPTION OF THE DRAWINGS

FIG. 2 is a diagram illustrating print data management information stored in an external storage device 23; (First embodiment)

FIG. 9 is a flow chart showing the operations of a printer apparatus, a printing system, a program, and a printing method according to the present invention; (Second embodiment)

Figure 1:
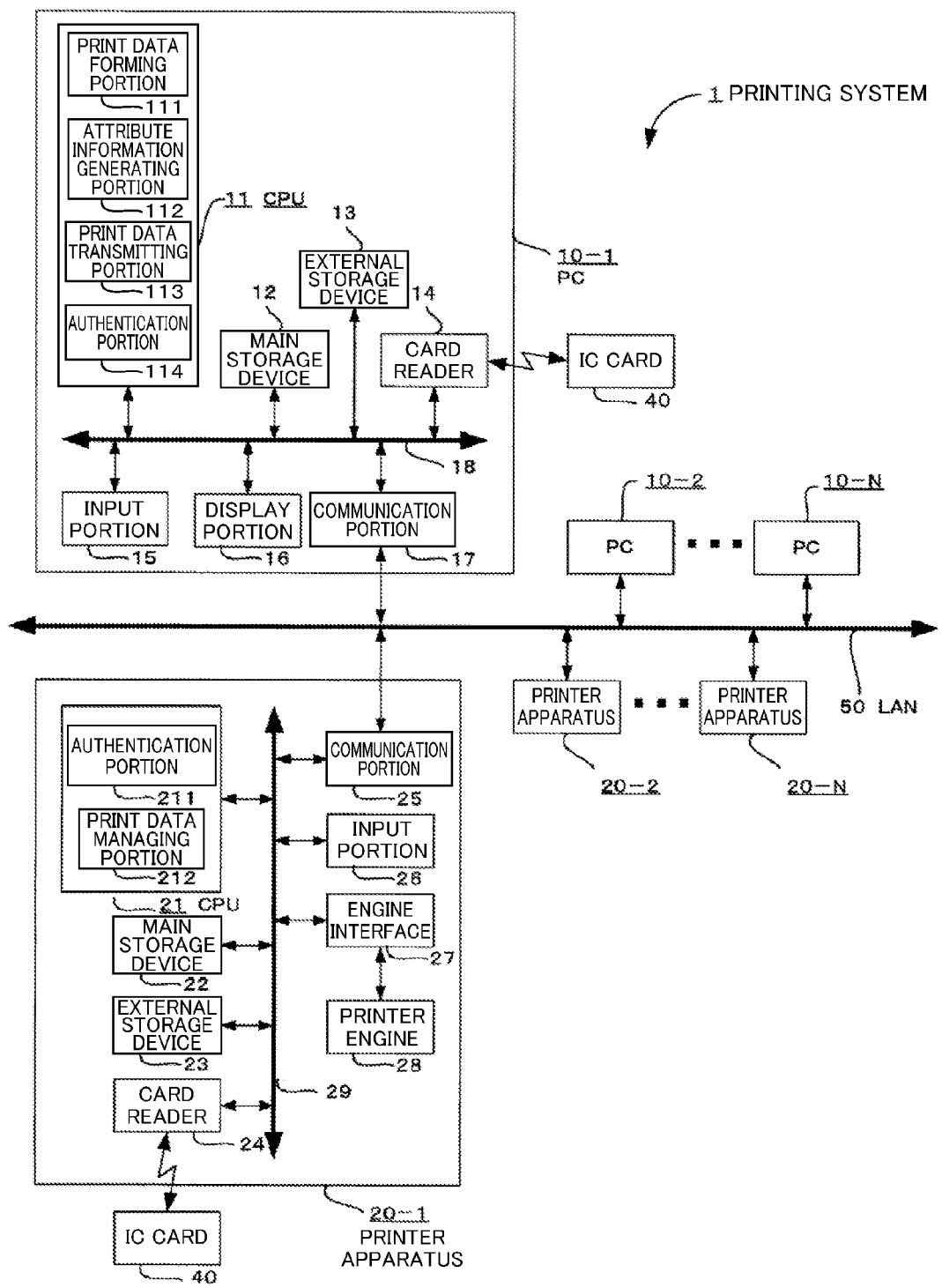
FIG. 1 is a block diagram showing the configuration of a printing system according to the present invention; (First embodiment)

EXPLANATION OF REFERENCE NUMERALS 1, 1A printing system
10-1~10-N, 10A-1~10A-N PC
11, 11A CPU
14 card reader
17 communication portion
20-1~20-N, 20A-1~20A-N printer apparatus
21, 21A CPU
23 external storage device
24 card reader
25 communication portion
26 input portion
28 printer engine
30 printer management apparatus
31, 31A CPU
34 communication portion
40 IC card
50 LAN
111 print data forming portion
112 print data transmitting portion
113 authentication portion
211 authentication portion
212 print data managing portion
213 print data acquiring portion
311 print data managing portion Preferred Mode for Carrying Out the Invention The present invention realizes an object of improving security and user convenience by a printing system in which a print data forming device and a plurality of printer apparatuses are connected through a network, and the printer apparatuses carry out printing on the basis of print data formed by the print data forming device, in which the print data forming device includes a print data forming means for forming the print data in accordance with an instruction from a user, further includes a print data providing means for providing the print data formed by the print data forming means to an information processing device connected to the network, in which the information processing device includes a print data storing means for storing the print data provided by the print data providing means, and the printer apparatus includes a print instruction inputting means for inputting a print instruction from the user, a print data acquiring means for acquiring, when the print instruction inputting means inputs the print instruction, the print data from the information processing device connected through the network in response to the print instruction, and a printing means for carrying out printing on the basis of the print data acquired by the print data acquiring means.

First Embodiment

Referring now to the drawings, the present invention is described in more detail by taking embodiments. FIG. 1 is a block diagram showing the configuration of a printing system according to the present invention. As shown in FIG. 1, a printing system 1 is a network system such as a local area network that includes a plurality of PCs 10-1 to 10-N and a plurality of printer apparatuses 20-1 to 20-N, which are connected through a LAN 50, an IC card carried by a user and connectable to the PCs 10-1 to 10-N and the printer apparatuses 20-1 to 20-N, etc. and in which the printer apparatuses 20-1 to 20-N carry out printing based on print data formed by the PCs 10-1 to 10-N. The LAN 50 is a local area network provided in predetermined ranges such as within a department or division of companies, and can be built by Ethernet® or the like.

Although the plurality of PCs 10-1 to 10-N may respectively have various configurations, the respective configurations of the PCs 10-1 to 10-N can be considered to be substantially the same for the configuration of the present invention. Therefore, the configuration of the PC 10-1 is described and the description of the configurations of the other PCs 10-1 to 10-N is omitted. Similarly, regarding the respective configurations of the plurality of printer apparatuses 20-1 to 20-N, the configuration of the printer apparatus 20-1 is described. The same is true for the other embodiments. The PC 10-1 is a computer including a CPU 11, a main storage device 12, an external storage device 13, a card reader 14, an input portion 15, a display portion 16, a communication portion 17, etc. that are connected to the CPU 11 through a system bus 18 or the like.

The CPU 11 runs programs such as an operating system (hereinafter referred to as "OS"), an application program, and a printer driver that are stored in the main storage device 12 and the external storage device 13 to control the overall operation of the PC 10-1, to implement a print data forming portion 111, an attribute information generating portion 112, a print data transmitting portion 113, an authentication portion 114, etc. The print data forming portion 111 runs document preparation software or the like, to edit and create data, determine a range of data to be the subject of printing, and form print data, in accordance with the operation of the input portion 15 by a user.

The attribute information generating portion 112 generates print data attribute information representing an attribute of the print data formed by the print data forming portion 111. The print data attribute information is information representing attributes of the print data, and includes print data identification information for identifying the print data, user identification information for identifying a user who has issued an instruction to form print data, print setting information, etc. The print data identification information is information for identifying the print data, and includes a file name serving as a source of the print data formed by the print data forming portion, a page number representing a range of the data in a file, and so on. The user identification information is information for identifying a user who has issued an instruction to form print data, and includes a user name, an employee number, etc. The print setting information is information representing printing specifications set by a user, such as color, printing quality, number of sheets printed, etc. The print data transmitting portion 113 controls the transmission by the communication portion 17, and transmits the print data formed by the print data forming portion 111 and the print data attribute information generated by the attribute information generating portion 112 to the predetermined printer apparatuses 20-1 to 20-N connected through the LAN 50.

The authentication portion 114 carries out authentication determination processing for determining whether or not a user who has an IC card 40 mounted on the card reader 14 is a valid user who has authority to use the PC 10-1, i.e., whether or not the user is authenticated on the basis of authentication information inputted from the IC card 40. Specifically, the authentication portion 114 first carries out mutual authentication with the IC card 40, and determines whether or not the IC card 40 is valid. The authentication portion 114 reads out user identification information, user attribute identification information, etc. from the IC card 40 after confirming the validity of the IC card 40, and determines whether or not a user has authority to use the PC 10-1. That is, the authentication portion 114 makes a determination depending on whether or not the user identification information or the user attribute identification information that is read out of the IC card 40 is included in a list of identification information or user attribute information relating to a valid user that is stored in the external storage device 13 of the PC 10-1 or a system management server (not shown) connected through the LAN 50. In a case where the answer is in the affirmative, the authentication portion 114 authenticates the person in the possession of the IC card 40 as a valid user. When the authentication portion 114 has not authenticated a user yet, the PC 10-1 maintains a blocked state where the user cannot use PC 10-1, such as keeping the screen locked with the PC10-1. When the user is authenticated, the PC 10-1 releases the blocked state, to enter a state where it is available to the user.

The main storage device 12 is a storage device that can be directly utilized by the CPU 11, and includes RAM used as a work area of the CPU 11, ROM storing programs such as an activation program, and data (not shown). The external storage device 13 is a hard disk or the like, and stores various types of programs such as a program for carrying out user authentication and a program for creating and forming print data, and data. The card reader 14 is a communication interface for establishing communication with the inserted IC card 40. The input portion 15 is an input device such as a keyboard or a mouse for transmitting information from the user to the PC 10-1, and the display portion 16 is a display device such as a display for transmitting information from the PC 10-1 to the user.

The communication portion 17 is a communication interface connected to the LAN 50 for transmitting print data to the printer apparatuses 20-1 to 20-N, and realizes communication with at least one other communication device through the network such as the LAN 50. The printer apparatus 20-1 includes a CPU 21, a main storage device 22 connected to the CPU 21 through a system bus 29, an external storage device 23, a card reader 24, a communication portion 25, an input portion 26, an engine I/F 27, a printer engine 28 connected to the engine I/F 27, etc.

The CPU 21 controls the overall operation of the printer apparatus 20-1 by running programs stored in the main storage device 22 and the external storage device 23, to implement an authentication portion 211 and a print data managing portion 212, etc. The authentication portion 211 carries out authentication determination processing for determining whether or not the user having the IC card 40 has authority to use the printer apparatus 20-1 on the basis of the authentication information inputted from the IC card 40 mounted on the card reader 24. The contents of the processing are the same as those in the authentication portion 114 of the PC 10-1. The print data managing portion 212 carries out processing such as writing and reading of print data management information to and from the external storage device 23, recording of a print history, and reading and deletion of print data, to manage the print data (see FIGS. 2 and 5, described later). The main storage device 22 and the external storage device 23 respectively have the same functions as those of the main storage device 12 and the external storage device 13 of the PC 10-1. ROM in the main storage device 22 stores data such as a character code outputted by the printer engine 28. The external storage device 23 stores print data received from the PCs 10-1 to 10-N, print data management information, and a print history, etc.

FIG. 2 is a diagram illustrating print data management information stored in the external storage device 23. As shown in FIG. 2, the print data management information is information associating print data identification information such as a print data serial number for identifying print data by the printer apparatus 20-1, the date and time of receiving the print data, identification information relating to the PCs 10-1 to 10-N (PCID) that have formed the print data, a print data size, and a storage location (e.g., an address) with print data attribute information received from the PCs 10-1 to 10-N.

The card reader 24 is a communication interface for establishing communication with the inserted IC card 40. The communication portion 25 is a communication interface connected to the LAN 50 for receiving print data from the PCs 10-1 to 10-N, and brings about communication with the at least one other communication device through the network such as the LAN 50. The input portion 26 is an input device such as a key panel for transmitting information from a user to the printer apparatus 20-1. The engine I/F 27 is an interface for mediating the exchange of information between the system bus 29 and the printer engine 28 for outputting the print data to the printer engine 28. The printer engine 28 carries out printing on the basis of the print data provided through the engine I/F 27.

The IC card 40 is a portable information storage medium carried by the user for utilizing the printing system 1. The portable information storage medium is a portable information storage medium that stores information such that a predetermined device can read out the information, and includes, for example, another IC card such as an SIM (Subscriber Identifying Module) card and a UIM (User Identity Module) card, an IC tag, a portable telephone set having an IC card function, and a card including a bar code. The IC card 40 stores user identification information for identifying a user, for example, a user name and an employee number, user attribute identification information for identifying attributes of a user, for example, his or her department or post, and proof of validity information such as a secret key. The proof of validity information is information for proving the validity of the information stored in the IC card 40 to the PCs 10-1 to 10-N and the printer apparatuses 20-1 to 20-N.

Figure 3:
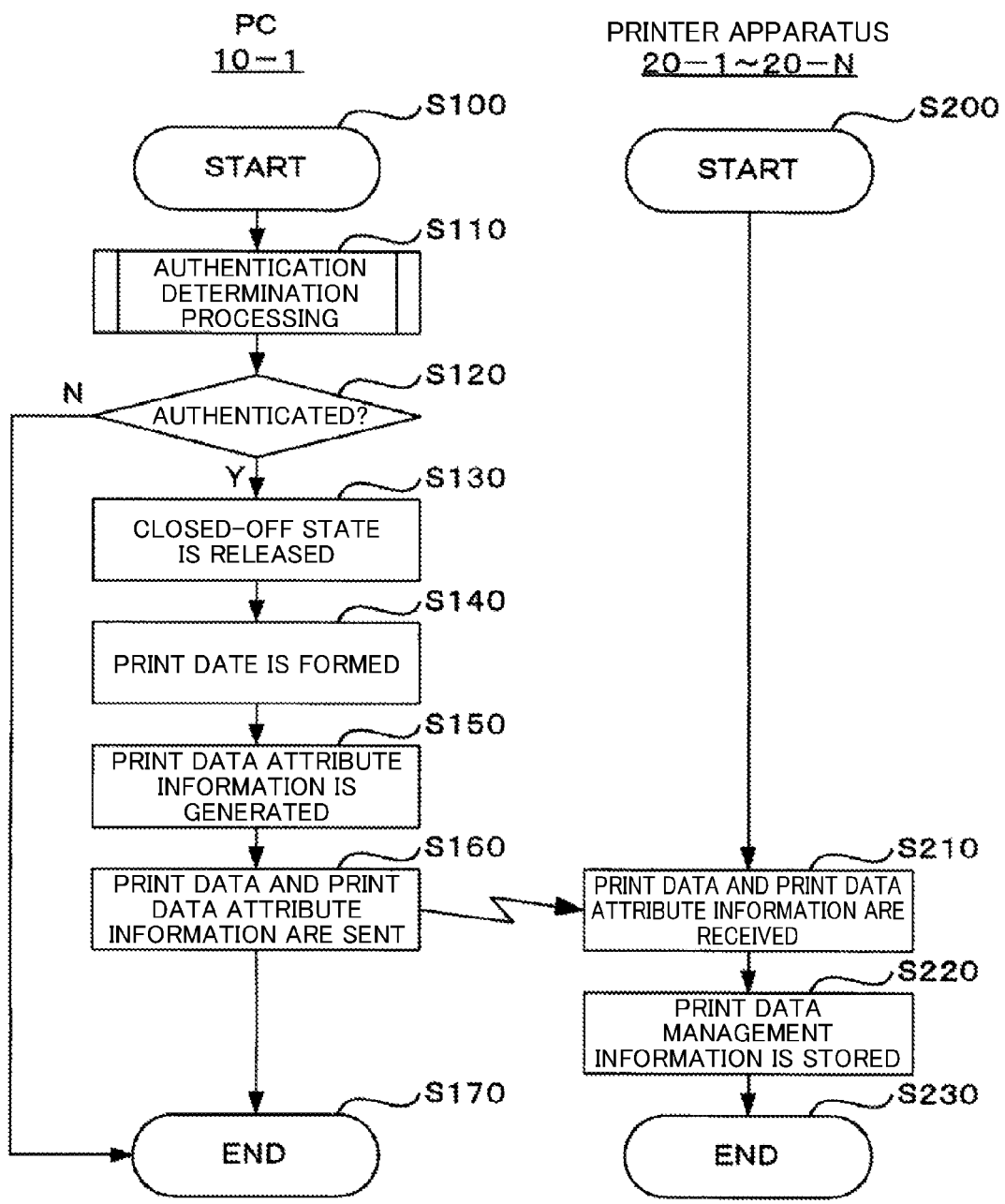
FIG. 3 is a flow chart showing the operation of a printing system according to the present invention; (First embodiment)
Figure 4:
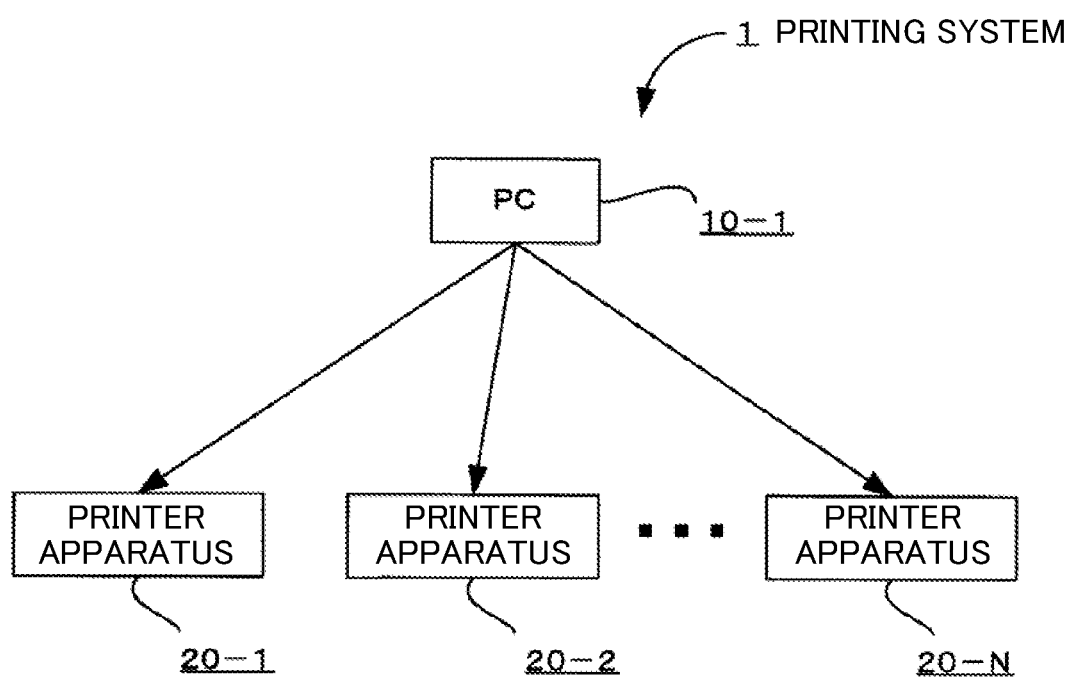
FIG. 4 is a diagram illustrating transmission and receiving of print data through a LAN 50; (First embodiment)

FIG. 3 is a flow chart showing the operation of the printing system according to the present invention and a printing method done thereby, explaining print data provision processing for providing print data from the PC 10-1 to the printer apparatuses 20-1 to 20-N. FIG. 4 is a diagram illustrating transmission and receiving of print data through the LAN 50. A description is now provided mainly of the processing of the CPU 11 of the PC 10-1 and the CPUs 21 of the printer apparatuses 20-1 to 20-N. A user inserts his or her own IC card 40 into the card reader 14 in order to use the PC 10-1. As shown in FIG. 3, in the step 110 ("step" is hereinafter referred to as "S"), the authentication portion 114 of the PC 10-1 carries out authentication determination processing. When the user is authenticated as a valid user, the PC 10-1 releases a blocked state, to enter a state where it is available to the user (S120 and S130).

The user operates the input portion 15 to start an application, edit and create data such as a document or an image, and designate a range of data to be printed. The print data forming portion 111 forms print data (S140). Furthermore, the user operates the input portion 15, to designate the color, the quality, etc. of prints to set printing. The attribute information generating portion 112 generates print data attribute information including user identification information, print data identification information, print setting information, etc. that are inputted from the IC card 40. The print data transmitting portion 113 transmits the print data and the print data attribute information to the plurality of printer apparatuses 20-1 to 20-N through the LAN 50 (S160 in FIG. 4), to terminate the processing (S170).

The printer apparatuses 20-1 to 20-N receive the print data and the print data attribute information (S210), and the print data managing portion 212 stores the print data and the print data management information generated from the print data attribute information in the external storage device 23 (S220), to terminate the processing (S230). Other PCs 10-2 to 10-N carry out print data provision processing in the same way as the PC 10-1 in the event that the other PCs 10-2 to 10-N form print data.

Figure 5:
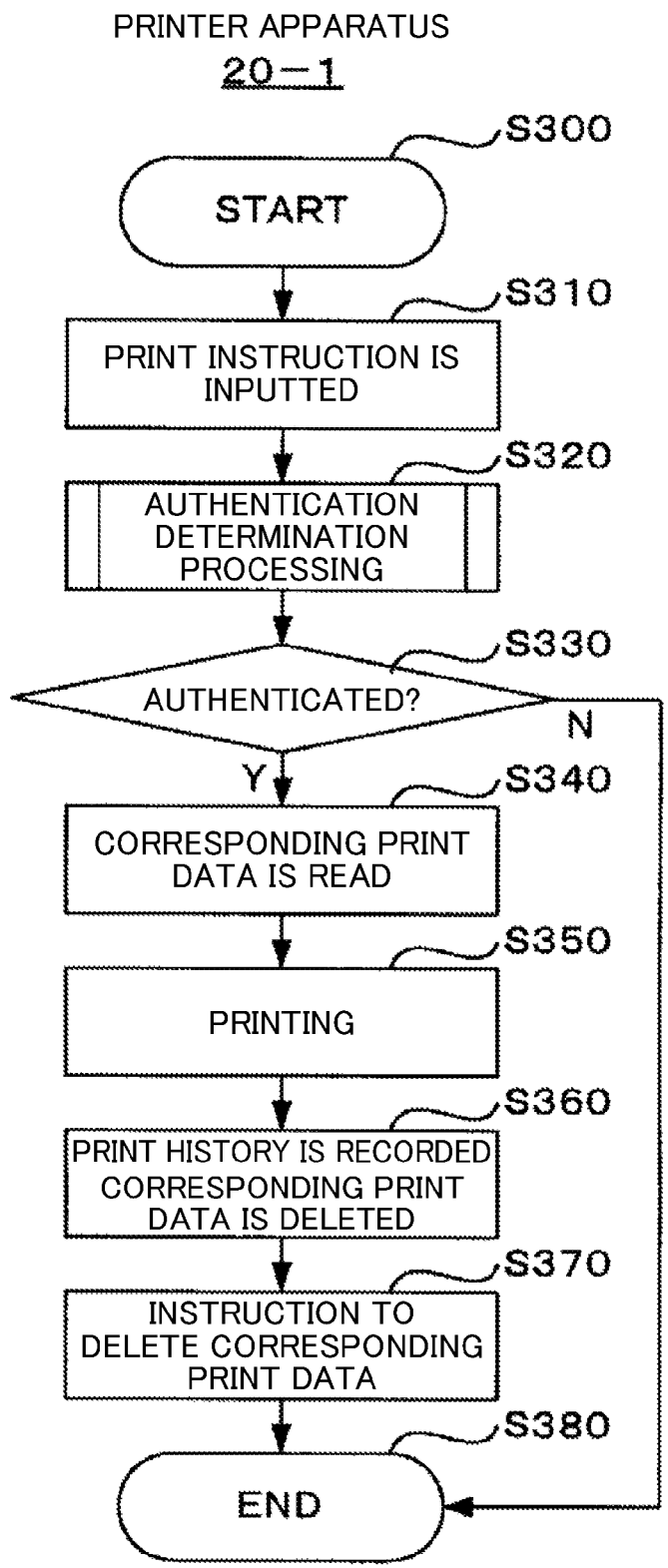
FIG. 5 is a flow chart showing the operation of a printing system and a printing method according to the present invention; (First embodiment)

FIG. 5 is a flow chart showing the operation of the printing system according to the present invention and a printing method performed thereby, explaining printing processing to carry out printing on the basis of the print data provided from the PC 10-1 to the printer apparatuses 20-1 to 20-N in the print data provision processing (see FIG. 3). A description is now provided mainly of the processing of the CPU 21 of the printer apparatus 20-1. A user who has issued an instruction to form print data at the PC 10-1 pulls the IC card 40 out of the card reader 14 of the PC 10-1 in order to have printing done after transmitting print information, then goes to a printer apparatus by which he or she wants to have printing done, for example, a printer apparatus 20-1 that is set up near the PC 10-1 and is not in use, mounts the IC card 40 on the card reader 24, and operates the input portion 26, to issue a print instruction.

As shown in FIG. 5, in step S310, the printer apparatus 20-1 is inputted with the print instruction to start processing. The authentication portion 211 carries out authentication determination processing (S320). When the authentication portion 211 authenticates the user as a valid user, the print data managing portion 212 refers to the print data management information stored in the external storage device 23, and reads out print data associated with user identification information relating to the user from the external storage device 23 (S330 and S340). When the user is party A, for example, the print data managing portion 212 reads out print data No. 472, 473, and 475 (see FIG. 2). The printer apparatus 20-1 outputs the read print data to the printer engine 28, to carry out printing (S350), and to terminate the processing (S360).

The print data managing portion 212 stores identification information relating to a user having issued a print instruction, print data identification information relating to print data to be the subject of printing, and a print history including the date and time of printing or the like in the external storage device 23, and erases the print data that has been the subject of printing from the external storage device 23 (S360). Furthermore, the print data managing portion 212 transmits an instruction to erase print data including the print data identification information relating to the print data that has been the subject of printing to the other printer apparatuses 20-2 to 20-N (S370). The printer apparatuses 20-2 to 20-N that have received the instruction erase print data corresponding to the print data identification information from the external storage device 23. The printer apparatus 20-1 terminates the processing (S380), to enter a waiting state for input of a print instruction and a waiting state for receiving of print data or the like. It should be noted that the print data managing portion 212 in each of the printer apparatuses 20-1 to 20-N erases from the external storage device 23 print data which has not been a subject of a print instruction (S310 in FIG. 4) for more than a predetermined time period from being received (S210 in FIG. 3), and stores the indication to the effect in the external storage device 23 as a print history. When the user performs printing at the other printer apparatuses 20-2 to 20-N, the other printer apparatuses 20-2 to 20-N carry out printing process in the same way as the printer apparatus 20-1.

According to the present embodiment, the printing system 1 thus provides the print data formed by the PC 10-1 to the plurality of printer apparatuses 20-1 to 20-N. Therefore, the user can have printing done after going to any one of the plurality of printer apparatuses and confirm whether or not the printer apparatus is available, which allows user convenience to be improved. In the PC 10-1, it is not required to designate the printer apparatuses 20-1 to 20-N to which output print data is outputted, which allows user convenience to be improved.

Furthermore, the printing system 1 carries out printing on the basis of print data corresponding to instructed user identification information (identification information relating to a user having issued a print instruction) inputted to the printer apparatus 20-1. Therefore, a plurality of users and the plurality of PCs 10-1 to 10-N can share the printer apparatuses 20-1 to 20-N, which allows efficiency and user convenience to be improved. Additionally, a plurality of print data associated with user identification information representing a user, who has issued a print instruction, can be collectively printed, which allows convenience to be improved. The printing system 1 can reliably leave a print history indicating which user requested printing, which print data the user performed printing for, when the user requested printing because the printer apparatuses 20-1 to 20-N store a print history including instructed user identification information, print data identification information, the date and time of printing, etc.

Furthermore, the printing system 1 can prevent print data from being leaked because the printer apparatuses 20-1 to 20-N erase from the external storage device 23 print data that was the subject of printing and print data that has not been a subject of printing more than a predetermined time period, which allows security to be improved. Additionally, the printing system 1 carries out printing when the printer apparatuses 20-1 to 20-N authenticate a user who issues a print instruction on the basis of the authentication information inputted from the IC card 40, which allows security to be improved. The user can easily prove the validity of the print instruction. The PC 10-1 similarly authenticates a user on the basis of the authentication information inputted from the IC card 40. Therefore, a user who issues an instruction to form print data is limited, which causes security to be improved. Furthermore, the user can issue an instruction to form print data and a print instruction by using the one IC card 40, which allows convenience to be improved.

Second Embodiment

Figure 6:
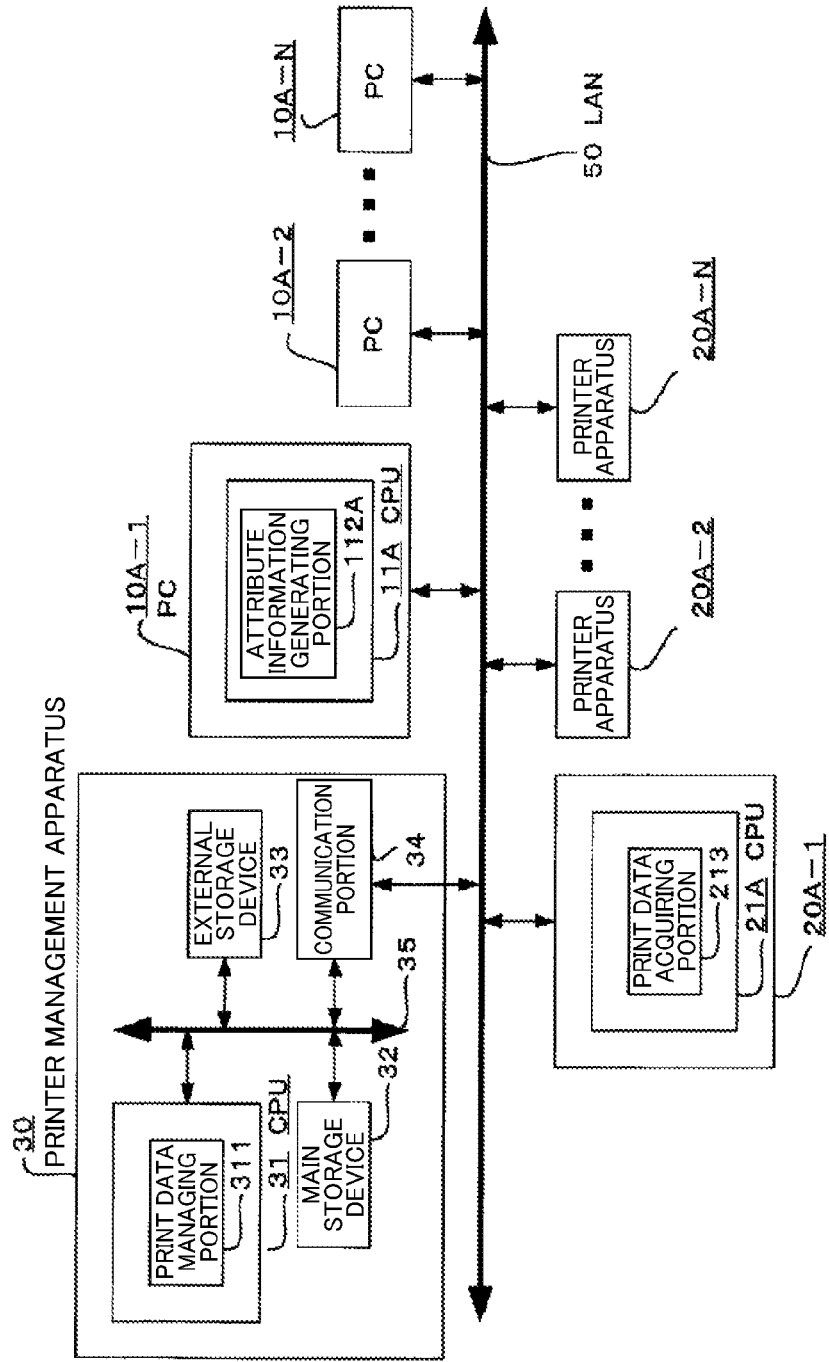
FIG. 6 is a block diagram showing the configuration of a printer apparatus and a printing system according to the present invention; (Second embodiment)

FIG. 6 is a block diagram showing the configuration of a printer apparatus and a printing system according to the present invention. Elements that carry out the same functions as those in the previous embodiment are assigned the same reference numerals or reference numerals consolidated at their ends, and hence the overlapping description and drawings are suitably omitted. As shown in FIG. 6, a printing system 1A is a network system including a plurality of PCs 10A-1 to 10A-N, a plurality of printer apparatuses 20A-1 to 20A-N, a printer management apparatus 30, etc, which are connected through a LAN 50, and providing print data formed by the PCs 10A-1 to 10A-N to the printer apparatuses 20A-1 to 20A-N through the printer management apparatus 30, to carry out printing.

The PC 10A-1 includes an attribute information generating portion 112A, for example, configured by a CPU 11A running programs stored in main storage device 12 and external storage device 13 in addition to substantially the same configuration as that of the PC 10-1 in the first embodiment. The attribute information generating portion 112A generates print data attribute information including print data identification information, user identification information, print setting information, instruction-capable user identification information for identifying a user who can issue a print instruction for print data, etc. (see FIG. 7, described later).

Each of the printer apparatuses 20A-1 to 20A-N include a print data acquiring portion 213, for example, configured by a CPU 21A running programs stored in main storage device 22 and external storage device 23 in addition to substantially the same configuration as that of the printer apparatuses 20-1 to 20-N in the first embodiment. The print data acquiring portion 213 requests the printer management apparatus 30 to provide print data and acquires the print data (see FIG. 9, described later). The printer management apparatus 30 is an information processing device including a CPU 31, a main storage device 32, an external storage device 33, a communication portion 34, etc. that are connected to the CPU 31 through a system bus 35. The printer management apparatus 30 carries out management of the print data formed by the PCs 10-1 to 10-N, such as storing the print data, and providing the print data to the printer apparatuses 20A-1 to 20A-N, as required.

The CPU 31 controls the overall operation of the printer management apparatus 30 by running programs stored in the main storage device 32 and the external storage device 33, to implement a print data managing portion 311 or the like. The print data managing portion 312 carries out processing such as writing and reading of print data management information to and from the external storage device 33, recording of a print history, and reading and deletion of print data, to manage the print data (see FIGS. 7 to 9, described later). The main storage device 32 and the external storage device 33, respectively, have the same functions as those of the main storage device 22 and the external storage device 23 in each of the printer apparatuses 20-1 to 20-N in the first embodiment. The external storage device 33 stores print data received from the PCs 10-1 to 10-N, print data management information generated from print data attribute information including instruction-capable user identification information, print data communication history, etc. The print data communication history is information representing a history of transmission and receiving of print data, for example, a print data receiving history including the date and time of receiving print information from the PCs 10-1 to 10-N, print data attribute information relating to the received print data, etc., and a print data transmission history including the date and time of transmitting print data to the printer apparatuses 20A-1 to 20A-N, print data attribute information relating to the transmitted print data, etc.

Figure 7:
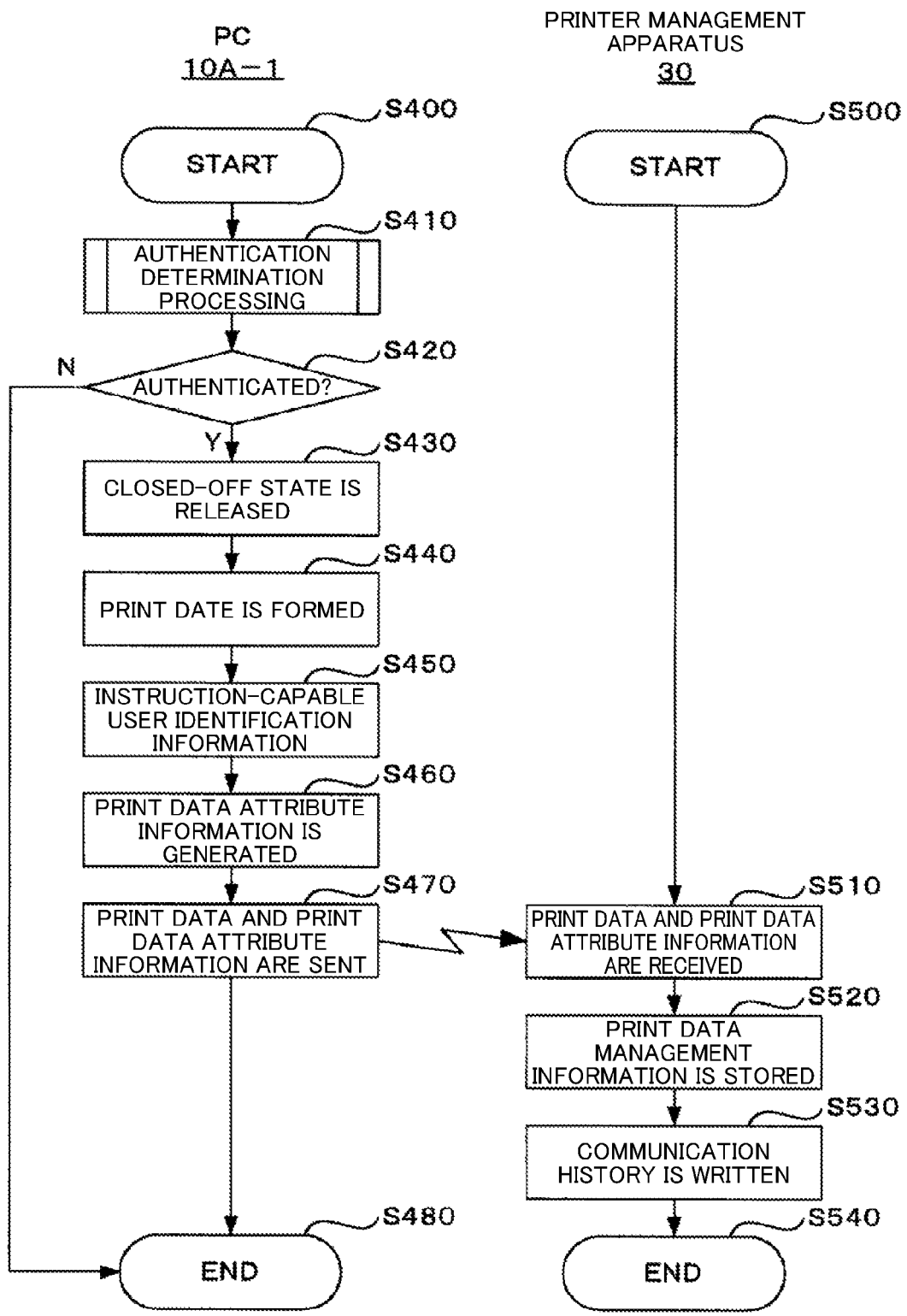
FIG. 7 is a flow chart showing the operations of a printer apparatus, a printing system and a printing method according to the present invention; (Second embodiment)
Figure 8:
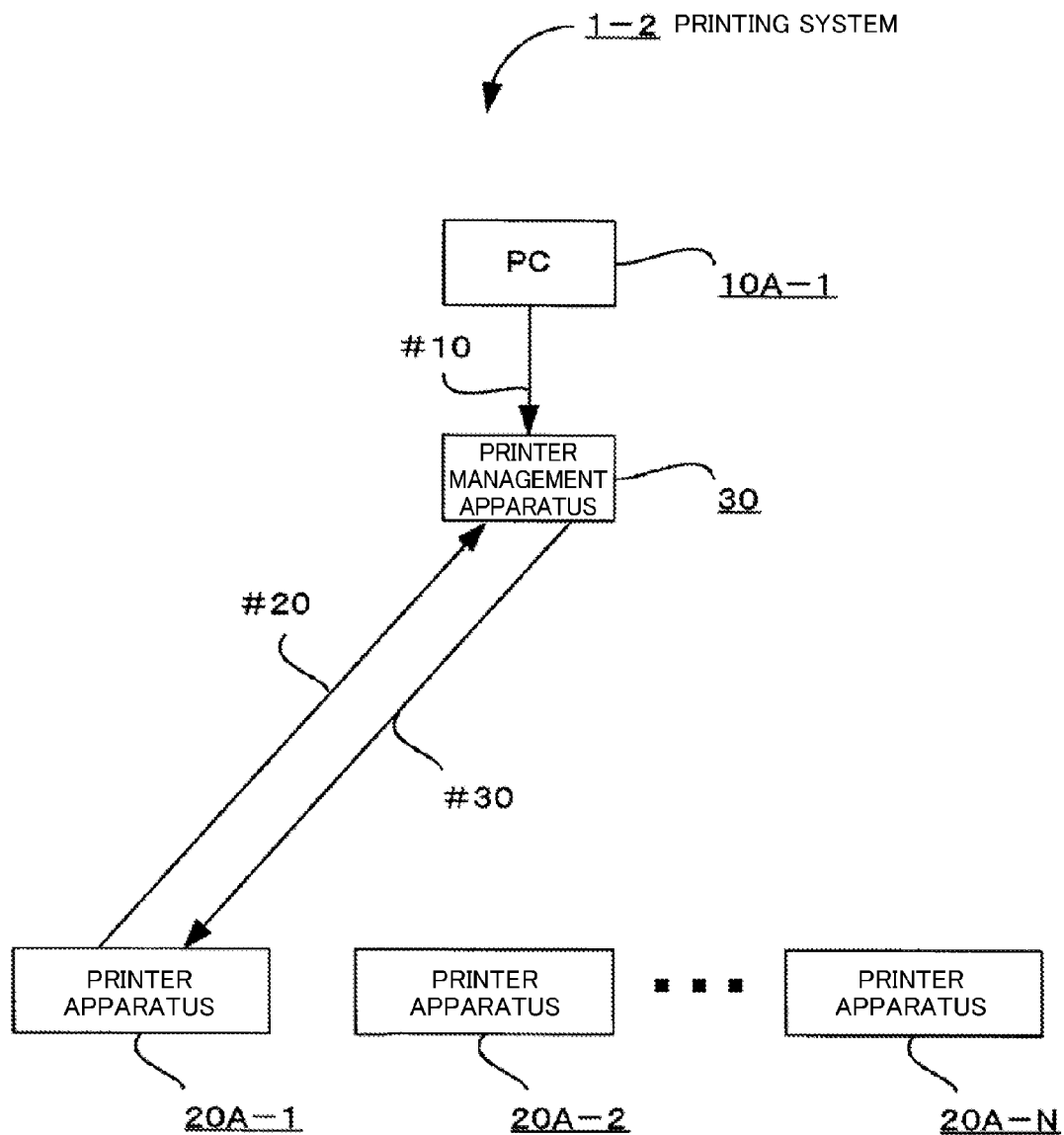
FIG. 8 is a diagram illustrating transmission and receiving of print data through a LAN 50; (Second embodiment)

FIG. 7 is a flow chart showing the operations of the printer apparatus and the printing system according to the present invention and a printing method performed thereby, explaining print data provision processing for providing print data from the PC 10A-1 to the printer management apparatus 30. FIG. 8 is a diagram illustrating transmission and receiving of print data through the LAN 50. A description is now provided mainly of the processing of the CPU 11A of the PC 10A-1 and the CPU 31 of the printer management apparatus 30. As shown in FIG. 7, the PC 10A-1 forms print data (S400 to S440), in the same way as the PC 10-1 carries out processing in the first embodiment (S100 to S140 in FIG. 3). A user selects and designates a user who can issue a print instruction, and the PC 10A-1 sets instruction-capable user identification information (S450). For example, party A operates the input portion 15 following instructions displayed on a display portion 16, and selects and designates party A and party B, in order to set party A himself or herself and party B as users who can have a created file printed. The attribute information generating portion 112A generates print data attribute information including the instruction-capable user identification information (S460). The print data transmitting portion 112 transmits print data, print data attribute information, etc. to the printer management apparatus 30 (S470, #10 in FIG. 8), and the PC 10A-1 terminates the processing (S480).

The printer management apparatus 30-1 receives the print data and the print data attribute information (S510). The print data managing portion 311 stores in the external storage device 23 the print data and print data management information generated from the print data attribute information (S520), and writes a receiving history into the external storage device 23 (S530), and terminates the processing (S540).

FIG. 9 is a flow chart showing the operations of the printer apparatus and the printing system according to the present invention, a program run thereby, and a printing method performed thereby, explaining printing processing for carrying out printing in response to an instruction from a user on the basis of print data provided to the printer management apparatus 30 from the PC 10A-1 in the print data provision processing (see FIG. 7). A description is now provided mainly of the processing of the CPU 21A of the printer apparatus 20A-1 and the CPU 31 of the printer management apparatus 30. As shown in FIG. 7, the printer apparatus 20A-1 carries out authentication determination processing or the like (S600 to S620), in the same way as the printer apparatus 20-1 carries out the processing in the first embodiment (S300 to S320 in FIG. 5).

When the user is authenticated as a valid user, the print data acquiring portion 213 transmits a print data provision request including user identification information for requesting to provide print data from the communication portion 25 to the printer management apparatus 30 (S640, #20 in FIG. 8). The printer management apparatus 30 receives the request (S710), refers to the print data management information stored in the external storage device 33, and reads out print data associated with the received user identification information from the external storage device 33 (S720). The printer management apparatus 30 transmits the read print data to the printer apparatus 20A-1 serving as a source of transmission of the request (S730, #30 in FIG. 8), writes a communication history into the external storage device 33, and erases the transmitted print data from the external storage device 33 (S740), then terminates the processing (S750). The printer apparatus 20A-1 receives the print data (S650), and outputs the print data to the printer engine 28 to carry out printing (S660), then terminates the processing (S670). When the user performs printing at the other printer apparatuses 20A-2 to 20A-N, the other printer apparatuses 20A-2 to 20A-N carry out printing, in the same way as the printer apparatus 20A-1.

According to the present embodiment, in addition to the same effect as that in the first embodiment, the printer management apparatus 30 stores the print data, which allows the print data to be centrally controlled and security to be improved. In the printing system 1A, the PC 10A-1 sets a user who can issue a print instruction in accordance with the designation of a user who has issued an instruction to form print data, reads out the print data on the basis of the set contents (instruction-capable user identification information) and instructed user identification information, and carries out printing. Therefore, the user who has issued the instruction to form print data can select the user who can issue the print instruction, which allows convenience and security to be improved. Furthermore, in the printing system 1A, the printer management apparatus 30 stores a communication history of print data, to manage the flow of the print data, which allows security to be improved.

[Modification]

The present invention is not limited to the embodiments, described above. Various modifications and changes can be made, which are also in an equivalent scope of the present invention. Although the printing system 1 transmits, from the PC 10-1 that has formed print data to the printer apparatuses 20-1 to 20-N, the print data, stores the print data in the external storage device 23 in the printer apparatuses 20-1 to 20-N, and reads out, when a print instruction is inputted thereto, the instruction and outputs the read instruction to the printer engine 28 to carry out printing in the first embodiment, for example, a method for providing the print data from the PC 10-1 to the printer engine 28 is not limited to the same.

Figure 10A:
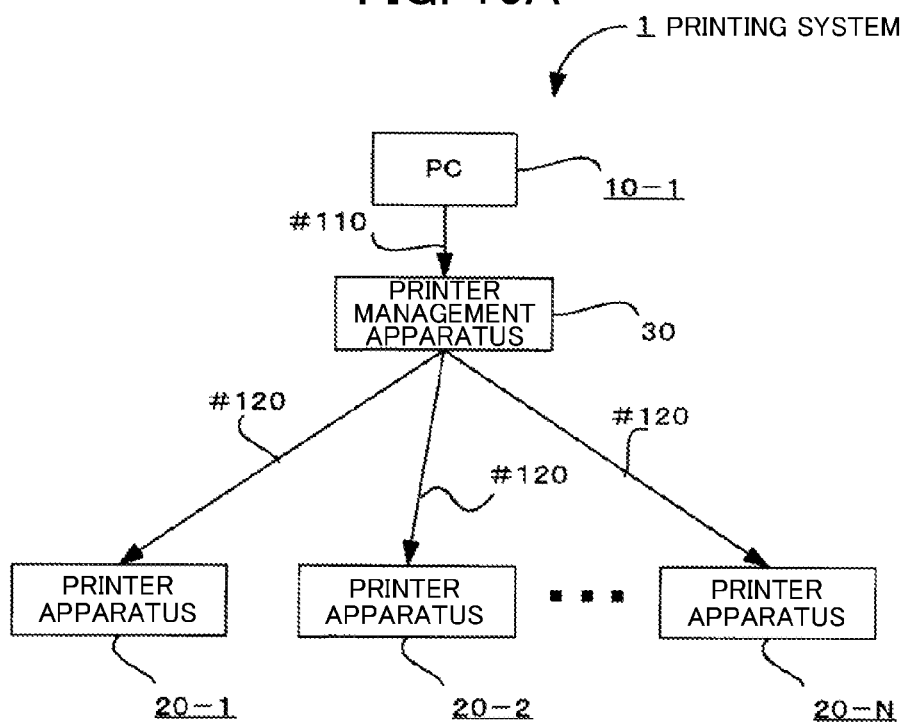
FIGS. 10A and 10B are diagrams illustrating transmission and receiving of print data through a LAN 50; (Modification)
Figure 10B:
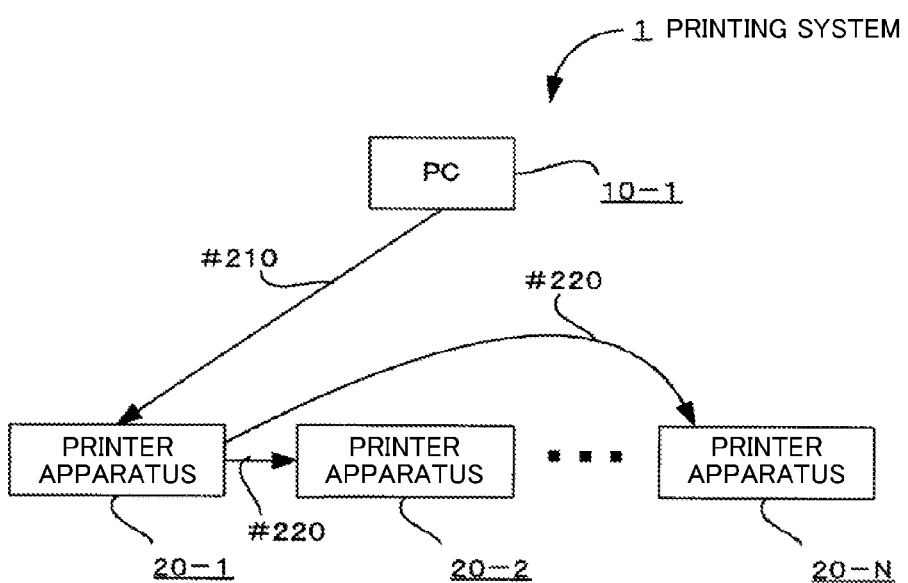

For example, the printing system 1 may transmit print data from the PC 10-1 to the printer management apparatus 30 (#110) and transmit the print data from the printer management apparatus 30 to the printer apparatuses 20-1 to 20-N (#120), as shown in FIG. 10A. The print data may be provided from the PC 10-1 to the printer apparatuses 20-1 to 20-N through one or a plurality of third devices. Furthermore, the printing system 1 may transmit print data from the PC 10-1 to the printer apparatus 20-1 (#210) and transmit the print data from the printer apparatus 20-1 to the other printer apparatuses 20-2 to 20-N (#220), as shown in FIG. 10B. The printing system 1 may provide the print data from the PC 10-1 to at least one predetermined printer apparatus and provide the print data from the printer apparatus to the other printer apparatuses.

Figure 11A:
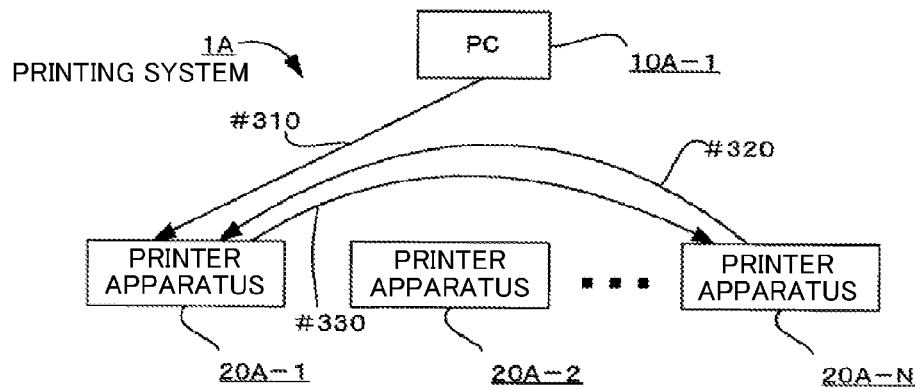
FIGS. 11A, 11B and 11C are diagrams illustrating transmission and receiving of print data through a LAN 50. (Modification)

Similarly, although the printing system 1A transmits from the PC 10-1 that has formed print data to the printer management apparatus 30 the print data, stores the print data in the external storage device 33 in the printer management apparatus 30, and provides the print data from the printer management apparatus 30 to the printer apparatus 20A-1 in response to a print data provision request from the printer apparatus 20A-1 that has inputted with a print instruction in the second embodiment, a method for providing print data from the PC 10A-1 to the printer engine 28 is not limited to the same. For example, the printing system 1A may transmit print data from the PC 10A-1 to the printer apparatus 20A-1 (#310), store the print data in the external storage device 23 in the printer apparatus 20A-1, transmit, when the printer apparatus 20A-N is inputted with a print instruction, a print data provision request to the printer apparatus 20A-1 (#320), and transmit the print data from the printer apparatus 20A-1 to the printer apparatus 20A-N in response to the request (#330), as shown in FIG. 11A.

Figure 11B:
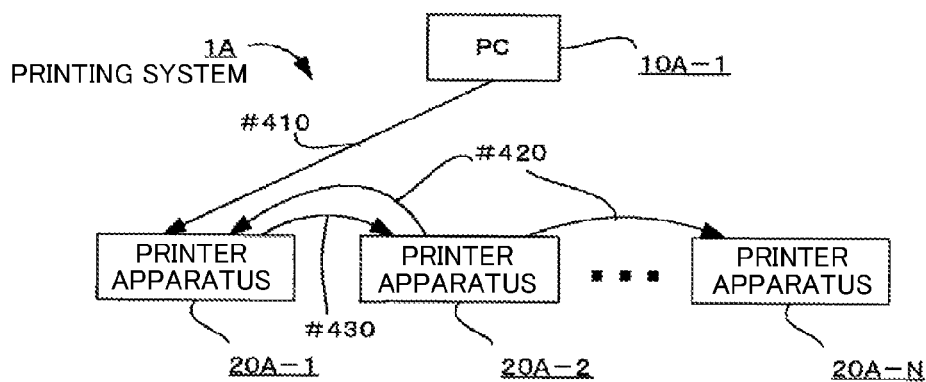
Figure 11C:
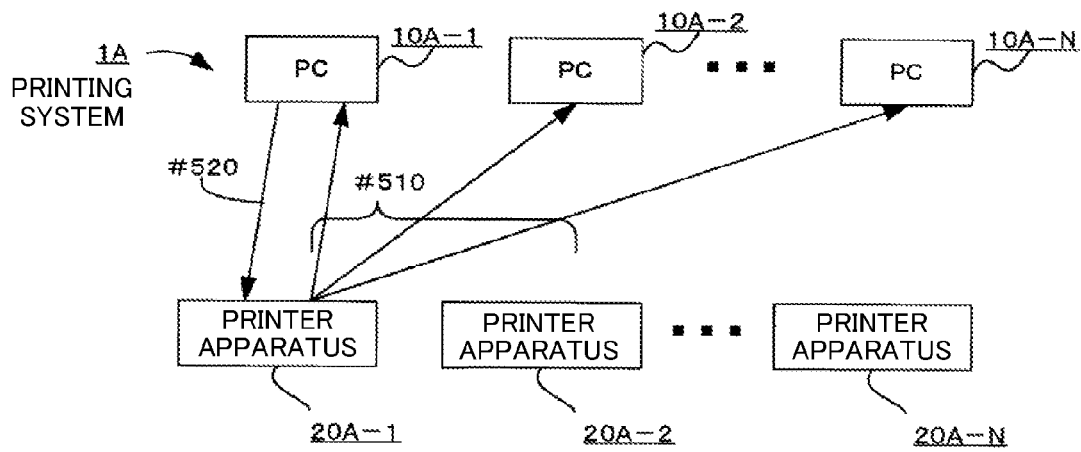

Furthermore, the printing system 1A transmits print data from the PC 10A-1 to the printer apparatus 20A-1 (#410), and transmits, when the printer apparatus 20A-2 is inputted with a print instruction, a print data provision request to the other printer apparatuses 20A-1 and 20A-3 to 20A-N (#420), as shown in FIG. 11B. The other printer apparatuses 20A-1 and 20A-3 to 20A-N may determine whether or not print data to be an object of the print data provision request is stored, and transmit, when the print data is stored, the print data from the printer apparatus 20A-1 to the printer apparatus 20A-2 in response to the request (#430). Furthermore, as shown in FIG. 11C, the printing system 1A may store print data in the external storage device 13 of the PC 10A-1, transmit, when the printer apparatus 20A-1 is inputted with a print instruction, a print data provision request to the predetermined PCs 10A-1 to 10A-N (#510), and transmit the print data from the PC 10A-1 to the printer apparatus 20A-1 in response to the request (#520).

Each of the printer apparatuses 20A-1 to 20A-N that is inputted with print instructions may transmit a print data provision request to at least one predetermined communication device connected to the LAN in order to acquire print data. Each of the printer apparatuses 20A-1 to 20A-N that is inputted with the print instructions acquires print data to be an object of a print instruction from the other printer apparatuses, so that the print data can be transmitted and received among the plurality of printer apparatuses 20A-1 to 20A-N. Furthermore, each of the printer apparatuses determines, when it receives the print data provision request, whether or not the print data to be an object is stored, so that the print data can be searched for among the printer apparatuses 20A-1 to 20A-N. Only by storing the print data in any of the printer apparatuses, the other printer apparatuses can, therefore, acquire the print data.

Although in the respective embodiments the printing systems 1 and 1A transmit print data attribute information together with print data from the PCs 10-1 and 10A-1, and store the print data attribute information, they may write the print data attribute information from the PCs 10-1 and 10A-1 to the IC cards 40, and read, when the printer apparatuses 20-1 to 20-N and 20A-1 to 20A-N input print instructions, the print data attribute information in order to acquire the print data based on the print data attribute information. A storage location of the print data attribute information is not limited. For example, the print data attribute information may be stored in a location that can be referred to when the print instruction is inputted. Furthermore, the PCs 10-1 and 10-N may write a storage location of print data (e.g., an IP address of a device storing the print data) into the IC card 40 as the print data attribute information.

In the respective embodiments, the PCs 10-1 to 10-N and 10A-1 to 10A-N, and the printer apparatuses 20-1 to 20-N and 20A-1 to 20A-N may include IC card detectors. The IC card detector detects that the IC card 40 has been placed at a predetermined position, for example, the IC card has been inserted into the card readers 14 and 24, or the IC card 40 has been moved to a predetermined place where information stored in the IC card 40 can be read, for example, the IC card 40 has been brought into a predetermined range. This leads to start of the processing, which allows user convenience to be improved. Furthermore, the printer apparatuses 20-1 to 20-N and 20A-1 to 20A-N, respectively, may input the detection of the IC cards 40 as print instructions.

Although the IC card 40 is illustrated as a portable information storage medium, the present invention is not limited to the same. For example, other portable information storage media may be used, provided that authentication information for authenticating a user who is a holder can be provided to the PCs 10-1 to 10-N and 10A-1 to 10A-N, and the printer apparatuses 20-1 to 20-N and 20A-1 to 20A-N. Consequently, a communication system between the portable information storage medium and the card readers 14 and 24 is not limited. For example, it may be any of a contact system, a non-contact system, and a contact/non-contact system.

Although in the second embodiment a user selects and designates a user who can issue a print instruction, and the PC 10-1 sets instruction-capable user identification information (S450 in FIG. 7), attributes of the user who can issue the print instruction may be set, to store in the external storage device 33 attribute identification information for identifying the attribute as print data attribute information. A plurality of persons, such as employees who are able to carry out printing, can be collectively designated depending on the respective departments of the employees, which allows convenience to be improved. When the plurality of persons can have printing done, the printer management apparatus 30 may erase print data under predetermined conditions, for example, erase print data after the plurality of persons have printing completed.

Although in the respective embodiments the printer apparatuses 20-1 and 20A-1 input user identification information from the IC cards 40 as object print data identification information for identifying print data to be an object of a print instruction, the printer apparatuses 20-1 and 20A-1 may display print data identification information relating to the print data on displays (not shown), while a user may operate the input portion 26, select print data to be an object of a print instruction, and input print data identification information, for example, object print data identification information. Furthermore, each of the printer apparatuses 20-1 and 20A-1 may input attributes such as a PCID and a department of a user as print data identification information. The print data identification information inputted by the printer apparatus 20-1 or 20A-1 is not limited, provided that the print data to be an object of a print instruction can be identified.

In the respective embodiments, the PCs 10-1 to 10-N and PCs 10A-1 to 10A-N may form print data described in a page description language (PDL) such as PCL (Printer apparatus Control Language) and provide the print data to the printer apparatuses 20-1 to 20-N and 20A-1 to 20A-N, and may convert the print data described in the PDL into image data such as bit map data, and provide the image data to the printer apparatuses 20-1 to 20-N and 20A-1 to 20A-N. A data format of print data transmitted and received between the PCs 10-1 to 10-N and 10A-1 to 10A-N, and the printer apparatuses 20-1 to 20-N and 20A-1 to 20A-N, is not limited.

Although in the second embodiment the printer management apparatus 30 stores a communication history of print data, the print history may be stored, similarly to the printer apparatuses 20-1 to 20-N in the first embodiment, upon receipt of notification of termination of printing after the print, data is transmitted to the printer apparatus 20A-1.

The invention claimed is:

1. A printing system including a printer apparatus, a plurality of other printer apparatuses including a first other printer apparatus, and a print data forming device connected through a network, the printer apparatus comprising:
an object print data identification information inputting means for inputting object print data identification information for identifying print data to be an object of a print instruction;
a print data acquiring means for acquiring print data from the first other printer apparatus among the plurality of other printer apparatuses, the print data acquiring means transmits a print data provision request to each of the plurality of other printer apparatuses and stores print data transmitted from the print data forming device, the first other printer apparatus in response to the print instruction inputted by the object print data identification information inputting means upon receipt of the print instruction, the print data acquiring means acquiring one or more print data associated with the object print data identification information inputted by the object print data identification information inputting means from the first other printer apparatus; and
a printing means for carrying out printing based on the print data acquired by the print data acquiring means,
wherein the print data acquiring means includes:
an object print data identification information transmitting means for transmitting the object print data identification information inputted by the object print data identification information inputting means into the first other printer apparatus; and
an object print data receiving means for receiving the print data associated with the object print data identification information transmitted by the object print data identification information transmitting means from the first other printer apparatus, and
wherein, the print data forming device includes:
a print data forming means for forming print data in accordance with a print instruction from a user;
a print instruction-capable user setting means for setting users who can issue a print instruction for the print data formed by the print data forming means to the user who has been instructed to form the print data and to users other than the user; and
a print data providing means for providing the first other printer apparatus with the print data formed by the print data forming device in association with instruction-capable user identification information for identifying the users set by the print instruction-capable user setting means.

2. The printing system according to claim 1, wherein the first other printer apparatus includes:
a print data storing means for storing print data;
an object print data identification information receiving means for receiving the object print data identification information transmitted by the object print data identification information transmitting means;
a determining means for determining whether or not the print data associated with the object print data identification information received by the object print data identification information receiving means are stored in the print data storing means; and
an object print data transmitting means for transmitting the print data associated with the object print data identification information to the printer apparatus when the determining means determines that the print data are stored.

3. The printing system according to claim 2, wherein
the print data storing means in the first other printer apparatus stores the print data provided by the print data providing means in association with the instruction-capable user identification information,
the printer apparatus includes an instructing user identification information inputting means for inputting instructing user identification information for identifying the user or an attribute of the user who issues the print instruction,
the first other printer apparatus includes a print data reading means for reading out print data from the print data storing means on the basis of the instructing user identification information inputted by the instructing user identification information inputting means and the instruction-capable user identification information stored in the print data storing means, and
the object print data transmitting means in the first other printer apparatus transmits the print data read out by the print data reading means to the printer apparatus.

4. The printing system according to claim 2, wherein the first other printer apparatus further includes a print data erasing means for erasing print data that were printed and/or print data remaining for more than a predetermined time period.

5. The printing system according to claim 1, wherein the printer apparatus further includes:

an authentication information inputting means for inputting authentication information for authenticating the user who issues the print instruction; and an authentication determining means for determining whether or not the user who issues the print instruction is authenticated on the basis of the authentication information inputted by the authentication information inputting means, and the printing means in the printer apparatus carries out printing when the authentication determining means determines that the user is authenticated.

6. The printing system according to claim 5, further comprising a portable information storage medium carried by the user, wherein the authentication information inputting means in the printer apparatus inputs the authentication information for authenticating the user who issues the print instruction through the portable information storage medium.

7. The printing system according to claim 1, further comprising a portable information storage medium carried by the user, wherein the print data forming device further includes:
- a formation-instructing user authentication information inputting means for inputting authentication information for authenticating the user who issues the instruction to form the print data through the portable information storage medium, and
- a formation-instructing user authenticating means for authenticating the user who issues the instruction to form the print data based on the authentication information inputted by the formation-instructing user authentication information inputting means.

8. A printing method for a printing system including a printer apparatus, a plurality of other printer apparatuses different from the printer apparatus and including a first other printer apparatus, and a print data forming device that are connected through a network, comprising:

- a print data forming step for forming print data by the print data forming device in accordance with an instruction from a user;
- a print instruction-capable user setting step for setting users who can issue a print instruction for the print data to the user who has been instructed to form the print data and users other than the user with the print data forming device;
- a print data providing step for providing the first other printer apparatus with the print data formed in the print data forming step by the print data forming device in association with instruction-capable user identification information for identifying the user set in the print instruction-capable user setting step;
- a print data storing step for storing the print data provided in the print data providing step by the first other printer apparatus;
- a print instruction inputting step for inputting the print instruction from the user by the printer apparatus; and
- a printing step for acquiring the print data stored in the print data storing step from the first other printer apparatus that, stores the print data by transmitting a print data provision request to each of the plurality of other printer apparatuses, and carrying out printing with the printer apparatus when the printer apparatus has inputted the print instruction in the print instruction inputting step.

* * * * *